United States Patent
Chu et al.

(10) Patent No.: US 10,296,527 B2
(45) Date of Patent: May 21, 2019

(54) DETERMINING AN OBJECT REFERENCED WITHIN INFORMAL ONLINE COMMUNICATIONS

(71) Applicant: International Business Machines Corporation, Armonk, NY (US)

(72) Inventors: Stephen M. Chu, Beabercreek, OH (US); Ning Duan, BeiJing (CN); Min Gong, Shanghai (CN); Yun Jie Qiu, Shanghai (CN); Junchi Yan, Shanghai (CN)

(73) Assignee: Internatioanl Business Machines Corporation, Armonk, NY (US)

( * ) Notice: Subject to any disclaimer, the term of this patent is extended or adjusted under 35 U.S.C. 154(b) by 652 days.

(21) Appl. No.: 14/962,232

(22) Filed: Dec. 8, 2015

(65) Prior Publication Data

US 2017/0161389 A1    Jun. 8, 2017

(51) Int. Cl.
*G06F 17/30* (2006.01)
*G06F 16/33* (2019.01)
*G06F 16/383* (2019.01)
*G06Q 30/02* (2012.01)

(52) U.S. Cl.
CPC ............ *G06F 16/33* (2019.01); *G06F 16/383* (2019.01); *G06F 17/30705* (2013.01); *G06Q 30/0201* (2013.01)

(58) Field of Classification Search
CPC ................ G06F 17/30958; G06F 17/30731
USPC ........................................................ 707/798
See application file for complete search history.

(56) References Cited

U.S. PATENT DOCUMENTS

| 8,407,253 B2 * | 3/2013 | Ryu .................. G06F 17/30958 |
| | | 707/790 |
| 2009/0240498 A1 | 9/2009 | Yih et al. |
| 2012/0054206 A1 | 3/2012 | Franks et al. |
| 2012/0078918 A1 | 3/2012 | Somasundaran et al. |
| 2014/0372451 A1 | 8/2014 | Franks et al. |

(Continued)

OTHER PUBLICATIONS

Metzler et al., "Similarity Measures for Short Segments of Text," 2007, Proceedings of the 29th European Conference on Information Retrieval (ECIR), p. 16-27.

*Primary Examiner* — Thu Nguyet T Le
(74) *Attorney, Agent, or Firm* — Grant Johnson; Otterstedt, Ellenbogen & Kammer, LLP

(57) ABSTRACT

A method for determining an object referenced within a set of one or more informal online communications comprises: generating a knowledge graph for a company based at least on formal online communications, the knowledge graph comprising a plurality of node elements, and the knowledge graph further comprising, for each node element of the knowledge graph, a corresponding halo comprising one or more words which are temporally proximate to that node element within the formal online communications; for each node element of the knowledge graph which is determined to be present in a given informal online communication, detecting a halo comprising one or more words which are temporally proximate to that node element within the given informal online communication; and identifying which of the plurality of node elements has a corresponding halo within the knowledge graph most similar to the detected halo, wherein the identified node element is the referenced object.

20 Claims, 3 Drawing Sheets

(56) References Cited

U.S. PATENT DOCUMENTS

2015/0006512 A1\* 1/2015 Alfonseca ............... G06F 17/24
                                                    707/722
2016/0364996 A1\* 12/2016 Gile ........................ G09B 7/00

\* cited by examiner

DETERMINING AN OBJECT REFERENCED WITHIN INFORMAL ONLINE COMMUNICATIONS

BACKGROUND OF THE INVENTION

The present invention relates generally to the electrical, electronic and computer arts, and, more particularly, to techniques for determining an object referenced within informal online communications.

A company may want to monitor online content in order to see the frequency with which it is discussed and/or the manner in which it is perceived. However, unlike a formal press release or news report, which purport to present an accurate statement of facts, informal online communications (e.g., chat, message boards, and/or social media) typically consist primarily of short segments of text which typically focus less on presenting facts accurately and more on presenting a personal opinion or commentary, often with the goal of being fresh, humorous, and/or dynamic. Analysis (e.g., data mining) of these informal communications accordingly presents unique challenges. Informal online communications often use words which may initially appear to refer to one concept but actually refer to another concept. The concepts to which words refer may be obscured. For example, rather than referring to a person by his or her actual name, informal online communications may instead refer to him or her using a nickname or other slang.

Conventional techniques for determining the concepts to which a given word refers often utilize a knowledge graph which analyzes the context within which a given word is used. For example, the word "apple" likely refers to a company when it appears with product names such as "iPhone" or "iPad" or with other company names such as "Microsoft" or "Google," but likely refers to a fruit when it appears in conjunction with other fruit names such as "pear" or "orange" or with food-related terms such as "sauce" or "juice." (The product names "iPhone" and "iPad" are registered trademarks, as are the company names "Apple," "Microsoft," and "Google.") But informal online communications may not include sufficient contextual cues to permit the use of conventional knowledge graphs to determine the meaning of a given word.

BRIEF SUMMARY

Principles of the invention, in accordance with embodiments thereof, provide techniques for determining an object referenced within a set of one or more informal online communications. Thus, for example, one or more illustrative embodiments of the present invention advantageously provide the capability to determine that informal online communications which appear to involve different objects are actually referring to the same object.

In one aspect, a method for determining an object referenced within a set of one or more informal online communications comprises: generating a knowledge graph for at least a given company based at least on a set of one or more formal online communications comprising at least one of one or more press releases about the given company and one or more news items about the given company, the knowledge graph comprising a plurality of node elements, and the knowledge graph further comprising, for each node element of the knowledge graph, a corresponding halo comprising one or more words which are temporally proximate to that node element within at least one of the one or more formal online communications; determining whether at least one of the node elements of at least the knowledge graph for the given company is present in a given informal online communication within the set of one or more informal online communications; for each node element of the knowledge graph for the given company which is determined to be present in the given informal online communication, detecting a halo comprising one or more words which are temporally proximate to that node element within the given informal online communication; and identifying which of the plurality of node elements has a corresponding halo, within the knowledge graph for the given company, most similar to the detected halo, wherein the identified node element is determined to be the referenced object.

In accordance with another embodiment of the invention, an apparatus includes a memory and at least one processor coupled to the memory. The processor is operative: to generate a knowledge graph for at least a given company based at least on a set of one or more formal online communications comprising at least one of one or more press releases about the company and one or more news items about the company, the knowledge graph comprising a plurality of node elements, and the knowledge graph further comprising, for each node element of the knowledge graph, a corresponding halo comprising one or more words which are temporally proximate to that node element within at least one of the one or more formal online communications; to determine whether at least one of the node elements of at least the knowledge graph for the given company is present in a given informal online communication within the set of one or more informal online communications; for each node element of the knowledge graph for the given company which is determined to be present in the given informal online communication, to detect a halo comprising one or more words which are temporally proximate to that node element within the given informal online communication; and to identify which of the plurality of node elements has a corresponding halo, within the knowledge graph for the given company, most similar to the detected halo, wherein the identified node element is determined to be the referenced object.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

As will be further discussed herein, embodiments of the present invention leverage the property that informal online communications are strongly timely and thus utilize a knowledge graph in which each node has a halo (temporal event profile) which can be used as an index of reference. Embodiments of the present invention will be described herein in the context of illustrative methods and apparatus in which a knowledge graph is generated for a company. It is to be appreciated, however, that the invention is not limited to the specific apparatus and/or methods illustratively shown and described herein. For example, in other embodiments, a knowledge graph may be generated for a person, an inanimate object, or even an abstract concept. Moreover, it will become apparent to those skilled in the art given the teachings herein that numerous modifications can be made to the embodiments shown that are within the scope of the claimed invention. Thus, no limitations with respect to the embodiments shown and described herein are intended or should be inferred.

Figure 1:
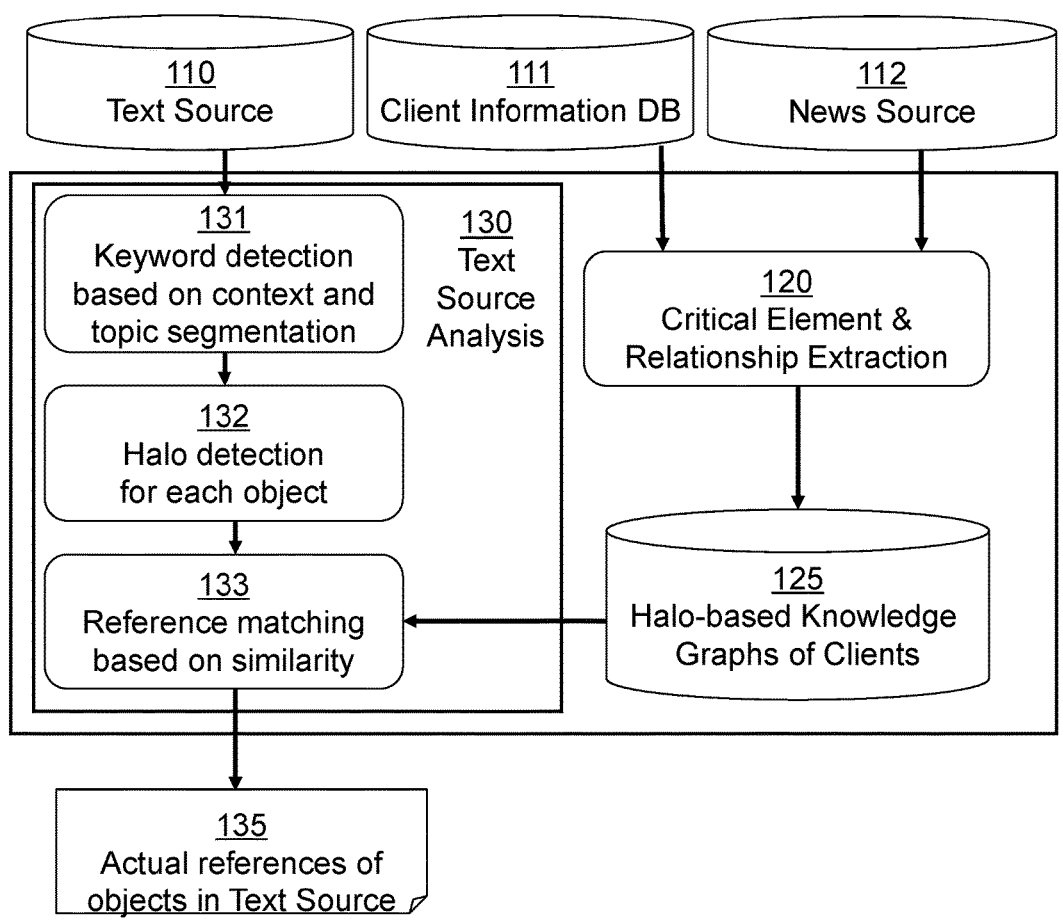
FIG. 1 depicts at least a portion of an exemplary system and/or method for determining the actual objects of references within informal online communications according to an embodiment of the invention.

FIG. 1 depicts at least a portion of an exemplary system and/or method for determining the actual objects of references within informal online communications according to an embodiment of the invention. Before module 130 analyzes informal online communications obtained from text source 110, knowledge graph collection 125 should be configured to store one or more company-specific halo-based knowledge graphs. Knowledge graph collection 125 can be configured to store a plurality of halo-based knowledge graphs each corresponding to a different company. Module 120 establishes a halo-based knowledge graph within knowledge graph collection 125 for a specific company by extracting critical elements and relationships for that specific company using company information database 111, which may be an ERP (Enterprise Resource Planning) database, and news source 112, which may include formal press releases and news reports.

Figure 2:
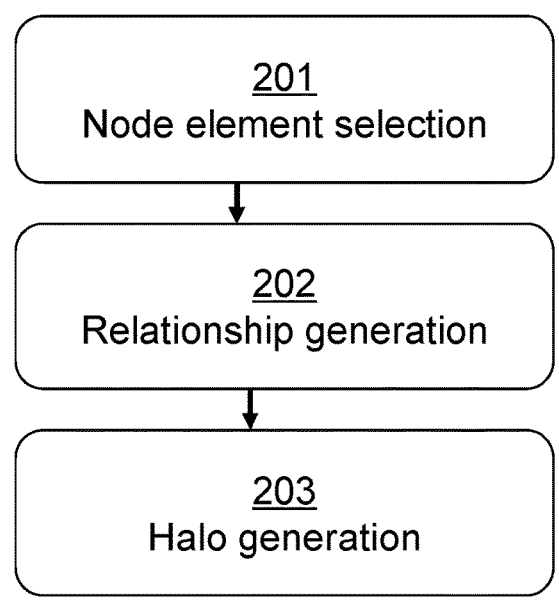
FIG. 2 depicts at least a portion of an exemplary system and/or method for establishing a halo-based knowledge graph according to an embodiment of the invention.

FIG. 2 depicts at least a portion of an exemplary system and/or method for establishing a halo-based knowledge graph according to an embodiment of the invention. In an embodiment of the present invention, module 120 shown in FIG. 1 may include modules 201, 202 and 203 shown in FIG. 2. As discussed above, the apparatus shown in FIG. 2 is described herein in connection with establishing a halo-based knowledge graph for a company, but it may also be used to establish a halo-based knowledge graph for a person, an inanimate object, or even an abstract concept.

From company information database 111, node element selection module 201 selects the major products, fields, and/or industries for a given company as the node elements. Based on analysis of news source 112, relationship generation module 202 calculates relationships (e.g., connections) between pairs of nodes in a manner similar to construction of a conventional knowledge graph. For each node element within a company's knowledge graph, halo generation module 203 first performs a search of news source 112 for items in which that node element is used in temporal proximity with the company's name, then extracts the keywords and/or tags from these items, and finally generates a temporal halo for the node element based on these extracted keywords and/or tags.

Returning now to FIG. 1, once module 120 constructs at least one halo-based knowledge graph within knowledge graph collection 125, text source analysis module 130 may be used to analyze informal online communications from text source 110. Text source analysis module 130 includes keyword detection module 131, halo detection module 132, and reference matching module 133. Module 131 performs keyword detection by using conventional context and topic segmentation techniques, which segment online communications into different topics based on the quote or reply information in online communications, and common keywords detection in the communications' context.

Halo detection module 132 performs the following steps for each segmentation of an informal online communication from text source 110: first, search the text for any node elements of at least one company's knowledge graph within knowledge graph collection 125. This may involve searching each of a plurality of company-specific knowledge graphs within knowledge graph collection 125. Next, if a node element is found within a company's knowledge graph, construct the "detected-halo" for that node. This construction is performed by the following steps: first, determine a company-specific knowledge graph within knowledge graph collection 125 which includes the found node element; next, do word segmentation for the text, then detect all the words in the text which also appear as the halo words of any node element in the previously-determined company-specific knowledge graph within knowledge graph collection 125; finally, construct the "detected-halo" as the set of the detected words in the previous step.

Next, reference matching module 133 performs the following steps for each node element in the previously-determined company-specific knowledge graph within knowledge graph collection 125: first, calculate similarity between the "detected-halo" from module 132 and each halo in the previously-determined company-specific knowledge graph within knowledge graph collection 125. The halo similarity may be calculated using, for example, an unweighted overlap percentage and/or a weighted overlap percentage in which a time distance between news time of the temporal halo and communication time of text source 110 may be used as a weight. Finally, select the node element in the previously-determined company-specific knowledge graph within knowledge graph collection 125 with the best halo similarity to be the actual reference, which then forms output 135.

Given the discussion thus far, it will be appreciated that, in general terms, an exemplary method for determining an object referenced within a set of one or more informal online communications according to an aspect of the invention comprises: generating a knowledge graph for at least a given company based at least on a set of one or more formal online communications comprising at least one of one or more press releases about the given company and one or more news items about the given company, the knowledge graph comprising a plurality of node elements, and the knowledge graph further comprising, for each node element of the knowledge graph, a corresponding halo comprising one or more words which are temporally proximate to that node element within at least one of the one or more formal online communications; determining whether at least one of the node elements of at least the knowledge graph for the given company is present in a given informal online communication within the set of one or more informal online communications; for each node element of the knowledge graph for the given company which is determined to be present in the given informal online communication, detecting a halo comprising one or more words which are temporally proximate to that node element within the given informal online communication; and identifying which of the plurality of node elements has a corresponding halo within the knowledge graph for the given company most similar to the detected halo, wherein the identified node element is determined to be the referenced object.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
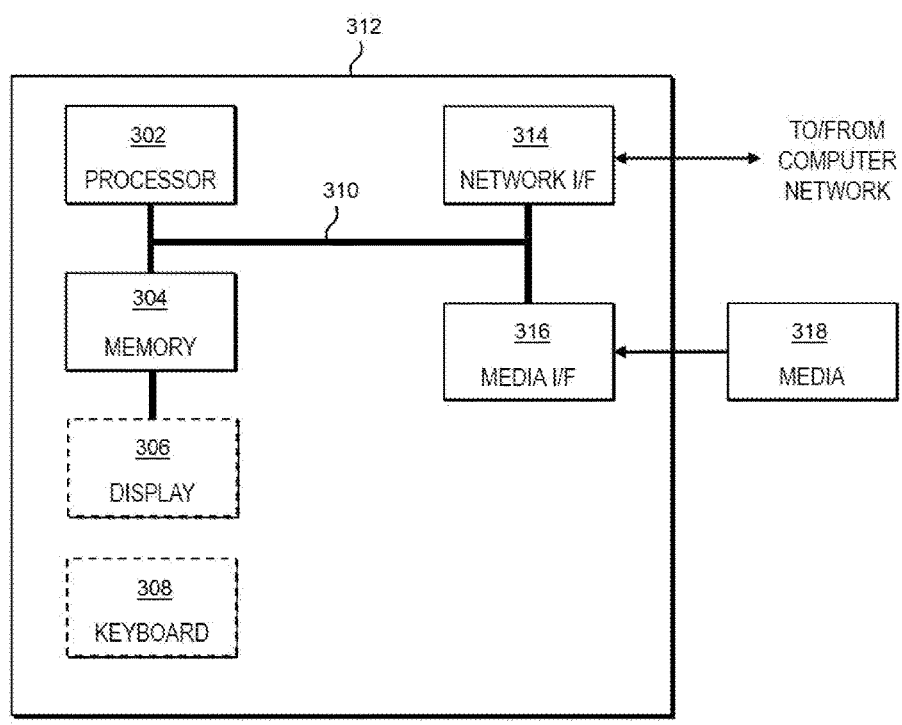
FIG. 3 depicts a computer system that may be useful in implementing one or more aspects and/or elements of the invention.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, modules 120 and/or 130 shown in FIG. 1. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining an object referenced within a set of one or more informal online communications, the method comprising:
    generating a knowledge graph for at least a given company based at least on a set of one or more formal online communications comprising at least one of one or more press releases about the given company and one or more news items about the given company, the knowledge graph comprising a plurality of node elements and relationships extracted from an enterprise resource planning database for the given company, and the knowledge graph further comprising, for each node element of the knowledge graph, a corresponding halo comprising one or more words which are temporally proximate to that node element within at least one of the one or more formal online communications;
    determining whether at least one of the node elements of at least the knowledge graph for the given company is present in a given informal online communication within the set of one or more informal online communications;
    for each node element of the knowledge graph for the given company which is determined to be present in the given informal online communication, detecting a halo comprising one or more words which are temporally proximate to that node element within the given informal online communication; and
    identifying which of the plurality of node elements has the corresponding halo, within the knowledge graph for the given company, most similar to the detected halo, wherein the identified node element is determined to be the referenced object;
    wherein generating a knowledge graph for at least the given company comprises:
        selecting the plurality of node elements from the enterprise resource planning database for the given company;
        calculating whether each pair within the plurality of node elements has a relationship within the enterprise resource planning database for the given company; and
        generating the corresponding halo for each node element by extracting one or more keywords from any formal online communication within the set of one or more formal online communications which includes temporally proximate references to that node element and to the given company.

2. The method of claim 1, wherein generating a knowledge graph for at least the given company comprises generating a plurality of knowledge graphs, each of the plurality of knowledge graphs corresponding to a respective at least one of a plurality of companies.

3. The method of claim 2, further comprising repeating the determining, detecting and identifying steps for each of the plurality of knowledge graphs.

4. The method of claim 1, wherein each corresponding halo within the knowledge graph represents a temporal event profile.

5. The method of claim 1, further comprising performing keyword detection on the given informal communication utilizing at least one of context and topic segmentation.

6. The method of claim 1, wherein identifying which of the plurality of node elements has the corresponding halo most similar to the detected halo comprises computing an overlap percentage between the detected halo and at least one of the plurality of node elements.

7. The method of claim 1, wherein identifying which of the plurality of node elements has the corresponding halo most similar to the detected halo further comprises weighting the overlap percentage based at least in part on a temporal proximity between the given informal communication and at least one formal online communication, within the set of one or more formal online communications, used to generate the corresponding halo.

8. The method of claim 1, further comprising, when at least one of the node elements of the knowledge graph is determined to be present in the given informal online communication, performing word segmentation on the given informal online communication.

9. The method of claim 1, wherein the plurality of node elements from the enterprise resource planning database comprise at least one of products, fields, and industries for the given company.

10. The method of claim 1, wherein the given informal communication comprises at least one of a chat, message board, and social media.

11. An apparatus for determining an object referenced within a set of one or more informal online communications, the apparatus comprising:
    a memory; and
    at least one processor coupled with the memory and operative:
        to generate a knowledge graph for at least a given company based at least on a set of one or more formal online communications comprising at least one of one or more press releases about the given company and one or more news items about the given company, the knowledge graph comprising a plurality of node elements and relationships extracted from an enterprise resource planning database for the given company, and the knowledge graph further comprising, for each node element of the knowledge graph, a corresponding halo comprising one or more words which are temporally proximate to that node element within at least one of the one or more formal online communications;
        to determine whether at least one of the node elements of at least the knowledge graph for the given company is present in a given informal online communication within the set of one or more informal online communications;
        for each node element of the knowledge graph for the given company which is determined to be present in the given informal online communication, to detect a halo comprising one or more words which are temporally proximate to that node element within the given informal online communication; and
        to identify which of the plurality of node elements has the corresponding halo within the knowledge graph for the given company most similar to the detected halo, wherein the identified node element is determined to be the referenced object;

wherein generating a knowledge graph for at least the given company comprises:
selecting the plurality of node elements from the enterprise resource planning database for the given company;
calculating whether each pair within the plurality of node elements has a relationship within the enterprise resource planning database for the given company; and
generating the corresponding halo for each node element by extracting one or more keywords from any formal online communication within the set of one or more formal online communications which includes temporally proximate references to that node element and to the given company.

12. The apparatus of claim 11, wherein generating a knowledge graph for at least the given company comprises generating a plurality of knowledge graphs, each of the plurality of knowledge graphs corresponding to a respective at least one of a plurality of companies.

13. The apparatus of claim 12, wherein the at least one processor is further operative to repeat the determining, detecting and identifying steps for each of the plurality of knowledge graphs.

14. The apparatus of claim 11, wherein the plurality of node elements from the enterprise resource planning database comprise at least one of products, fields, and industries for the given company.

15. The apparatus of claim 11, wherein the given informal communication comprises at least one of a chat, message board, and social media.

16. A computer program product comprising a non-transitory machine-readable storage medium having machine-readable program code embodied therewith, said machine-readable program code comprising:
machine-readable program code configured:
to generate a knowledge graph for at least a given company based at least on a set of one or more formal online communications comprising at least one of one or more press releases about the given company and one or more news items about the given company, the knowledge graph comprising a plurality of node elements and relationships extracted from an enterprise resource planning database for the given company, and the knowledge graph further comprising, for each node element of the knowledge graph, a corresponding halo comprising one or more words which are temporally proximate to that node element within at least one of the one or more formal online communications;
to determine whether at least one of the node elements of at least the knowledge graph for the given company is present in a given informal online communication within the set of one or more informal online communications;
for each node element of the knowledge graph for the given company which is determined to be present in the given informal online communication, to detect a halo comprising one or more words which are temporally proximate to that node element within the given informal online communication; and
to identify which of the plurality of node elements has the corresponding halo within the knowledge graph for the given company most similar to the detected halo, wherein the identified node element is determined to be the referenced object;
wherein generating a knowledge graph for at least the given company comprises:
selecting the plurality of node elements from the enterprise resource planning database for the given company;
calculating whether each pair within the plurality of node elements has a relationship within the enterprise resource planning database for the given company; and
generating the corresponding halo for each node element by extracting one or more keywords from any formal online communication within the set of one or more formal online communications which includes temporally proximate references to that node element and to the given company.

17. The computer program product of claim 16, wherein generating a knowledge graph for at least the given company comprises generating a plurality of knowledge graphs, each of the plurality of knowledge graphs corresponding to a respective at least one of a plurality of companies.

18. The computer program product of claim 17, further comprising machine-readable program code configured to repeat the determining, detecting and identifying steps for each of the plurality of knowledge graphs.

19. The computer program product of claim 16, wherein the plurality of node elements from the enterprise resource planning database comprise at least one of products, fields, and industries for the given company.

20. The computer program product of claim 16, wherein the given informal communication comprises at least one of a chat, message board, and social media.

* * * * *